C. WALTERS, Jr.
STEERING DEVICE.
APPLICATION FILED MAR. 15, 1919.
1,339,048.
Patented May 4, 1920.
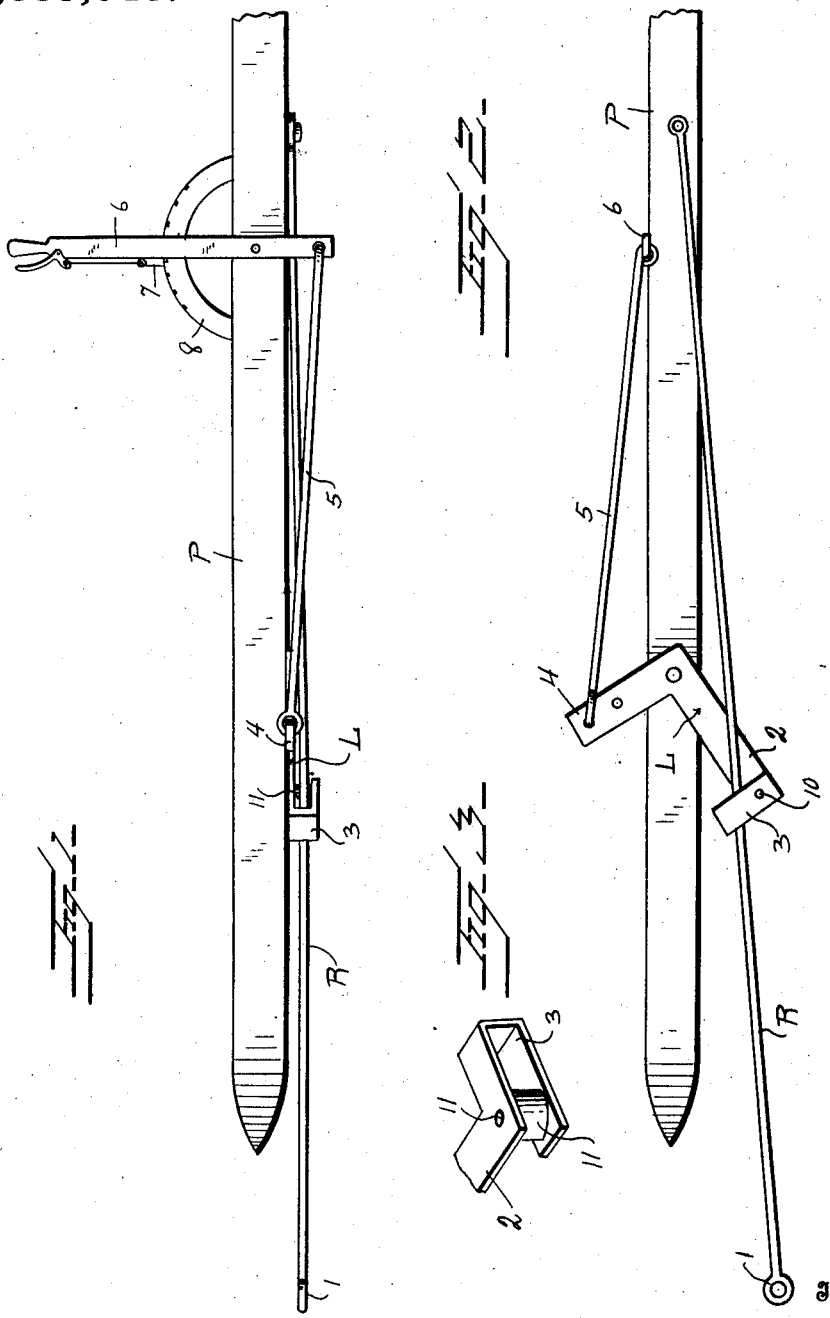

UNITED STATES PATENT OFFICE.

CHARLES WALTERS, JR., OF WESSINGTON SPRINGS, SOUTH DAKOTA.

STEERING DEVICE.

1,339,048.  Specification of Letters Patent.  Patented May 4, 1920.

Application filed March 15, 1919. Serial No. 282,905.

*To all whom it may concern:*

Be it known that I, CHARLES WALTERS, Jr., a citizen of the United States, residing at Wessington Springs, in the county of Jerauld and State of South Dakota, have invented certain new and useful Improvements in Steering Devices, of which the following is a specification, reference being had to the accompanying drawings.

This invention relates to certain improvements in steering devices, and has relation more particularly to a device of this general character especially designed and adapted for use in connection with agricultural machines, such as corn huskers or the like, which are adapted to follow a row, and it is an object of the invention to provide a novel and improved mechanism of this general character embodying a hitch or draft rod engaged with the tongue of the vehicle, together with means for swinging said hitch or draft rod laterally, whereby the draft animals, and more particularly the lead animals, are caused to maintain the desired travel of the vehicle.

It is also an object of the invention to provide a novel and improved means of this general character which is particularly adapted for use in connection with a lead animal or animals and whereby the desired travel of the vehicle is maintained and more particularly in a hilly country.

The invention consists in the details of construction and in the combination and arrangement of the several parts of my improved steering device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation illustrating a steering device constructed in accordance with an embodiment of my invention.

Fig. 2 is a view in bottom plan of the structure as illustrated in Fig. 1, and

Fig. 3 is a fragmentary view in perspective illustrating the loop carried by the outer end portion of an arm of the bell crank lever as herein included.

As disclosed in the accompanying drawings, P denotes a draft pole of a conventional type and which may coact with a corn husker or other agricultural machine and engaged with the inner end portion of the pole P is an end portion of a draft or hitch rod R which has movement laterally of the pole P. The rod R is of a length to terminate in advance of the pole P and the forward end portion of such rod R has an eye 1 or the like whereby a lead animal or animals may be readily hitched thereto.

At a point materially inward of its outer end, the under surface of the pole P has pivotally engaged therewith the heel portion of a bell crank lever L. An arm 2 of the lever L is forwardly directed and is provided at its forward or free end portion with a laterally directed loop 3 through which the rod R extends. The second arm 4 of the lever L is laterally directed, and engaged with the outer or free end portion thereof is a rigid link 5 which extends rearwardly and is operatively engaged with the upstanding lever 6 carried by the pole P adjacent its inner end, so that the same may be readily manipulated by an occupant of the vehicle. The lever 6 is provided with a conventional type of latch mechanism 7 coacting with the upstanding segmental rack 8 also carried by the pole P so that the crank lever L may be locked in its various adjustments under the influence of the lever 6.

The end portion of the loop 3 is closed by a pin 10 upon which is mounted, between the side portions of the loop 3, the roller or sleeve 11 to facilitate the functioning of the bell crank lever L.

By imparting the desired movement to the lever 6, the bell crank lever L will be swung in a direction to move the rod R laterally of the pole P in either direction, so that the pull of the lead animals will serve to cause the vehicle to travel in the desired path, such as along a row of corn or the like. In practice, it has been found that my improved steering mechanism is particularly adapted for use in localities where the land is hilly.

From the foregoing description, it is thought to be obvious that a steering device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a draft pole of a vehicle, a rod having one end portion pivotally engaged with said pole about a vertical axis, the opposite end portion of the rod being provided with hitching means, a lever pivotally engaged with a pole about a vertical axis and at a point in advance of the pivotal connection between the rod and the pole, said lever being provided with a laterally directed loop through which the rod extends, and means for imparting swinging movement to the lever.

2. In combination with a draft pole of a vehicle, a rod having one end portion pivotally engaged with said pole about a vertical axis, the opposite end portion of the rod being provided with hitching means, a lever pivotally engaged with a pole about a vertical axis and at a point in advance of the pivotal connection between the rod and the pole, said lever being provided with a laterally directed loop through which the rod extends, means for imparting swinging movement to the lever, and a roller rotatably supported within the loop and closing an end thereof.

In testimony whereof I hereunto affix my signature in the presence of two witnesses.

CHARLES WALTERS, Jr.

Witnesses:
R. E. GREER,
T. M. ENDAHL.